United States Patent [19]
Morton

[11] 4,297,904
[45] Nov. 3, 1981

[54] GIMBALS

[75] Inventor: Donald F. Morton, Welwyn, England

[73] Assignee: British Aerospace Public Limited Company, London, England

[21] Appl. No.: 189,834

[22] PCT Filed: May 30, 1979

[86] PCT No.: PCT/GB79/00089
§ 371 Date: Jan. 31, 1980
§ 102(e) Date: Jan. 2, 1980

[87] PCT Pub. No.: WO79/01161
PCT Pub. Date: Dec. 27, 1979

[30] Foreign Application Priority Data
May 31, 1978 [GB] United Kingdom ............... 25711/78

[51] Int. Cl.³ ...................... G01C 19/22; F16C 11/12
[52] U.S. Cl. ........................................ 74/5 F; 29/434;
29/558; 64/27 B; 248/179; 308/2 A
[58] Field of Search ............ 74/5 F; 64/15 B, 17 SP, 64/18, 27 B; 308/2 A; 248/583, 590, 183, 184, 179; 29/434, 558

[56] References Cited
U.S. PATENT DOCUMENTS

| | | | |
|---|---|---|---|
| 3,142,888 | 8/1964 | Troeger | 308/2 A X |
| 3,301,073 | 1/1967 | Howe | 74/5 F |
| 3,678,764 | 7/1972 | Erdley et al. | 74/5 F |
| 3,943,778 | 3/1976 | Wyse | 74/5 F |
| 4,100,813 | 7/1978 | Previte | 74/5 F |
| 4,207,668 | 6/1980 | Previte | 308/2 A X |

Primary Examiner—Rodney H. Bonck
Attorney, Agent, or Firm—Cushman, Darby & Cushman

[57] ABSTRACT

A gimbal assembly for carrying a gyroscope rotor for spin about a z axis is described which has an inner boss (3), and outer ring (6), first and second gimbal frames (4 and 5) situated between the two, first outer pivots (8) pivoting the first frame (4) to the outer ring (6) about a y axis, second outer pivots (10) pivoting the second frame (5) to the outer ring (6) about an x axis, first inner pivots (11) pivoting the second frame (5) to the boss (3), and second inner pivots (9) pivoting the first frame to the boss (3) about the x axis, the gimbal frames (4 and 5) being interlaced one with another.

A preferred method of forming the inner boss (3), the outer ring (6), and the gimbal frames (4 and 5) from a billet of solid material is also described.

6 Claims, 8 Drawing Figures

GIMBALS

This invention relates to gimbals.

It is known to carry the rotor of a gyroscope on a single or multi-gimbal arrangement in which the gimbal frames or rings are interconnected by spring biassed pivots instead of free pivots, the spring biassing acting to oppose relative pivotal displacement of the gimbals, that is to say, acting in a torsional sense.

Defining x, y and z as mutually perpendicular rotor fixed and undisplaced axes, z being the spin axis, at a "tuned" speed of rotation N given by:

$$N = \left[ \frac{\epsilon_1{}^n (K_x + K_y)_n}{\epsilon_1{}^n (a + b - c)_n} \right]^{\frac{1}{2}} \quad \text{Equation 1.}$$

(where:

$K_x$, $K_y$ are spring constants of the pivots about x and y rotor axes, respectively, a, b and c are gimbal principle moments of inertia components about the x, y and z rotor axes, respectively, c being the polar moment, and n is the $n^{th}$ gimbal, i.e. the number of gimbals) it is found that the wind up torques from the spring biassed pivots and the dynamic reaction torques from the motion of the gimbals, ($n \geq 1$), as the consequence of a steady case displacement about an input axis, cancel one another when integrated over each revolution such that there is a zero mean torque applied to the rotor. As such the rotor can be regarded as conditionally free (i.e. over a limited angle) at the "tuned" speed.

A gyroscope employing only one gimbal ($n=1$) is inherently sensitive to an applied angular input at a period 1/2 N whence the rotor experiences a mean torque acting upon it over each revolution so causing a gyroscopic drift due to an unbalance between the gimbal dynamic torque and the wind up torques of the spring-biassed pivots, whereas, with two or more gimbals ($n \geq 2$) it is possible to balance the latter by adjusting the dynamic inertias $(a+b-c)_n$ of the individual gimbals.

This balancing of spatial torque vectors can be likened to the problem of balancing electrical vectors, for example 180° apart ($n=2$); 120° apart ($n=3$) and so on. In theory two vectors ($n=2$) can only be balanced to zero provided they are in perfect anti-phase, where with three or more ($n=\geq 3$) this restriction does not apply.

Mechanical complexity increases, however, with three gimbals or more; the present invention is concerned with double gimbals and has for an objective the provision of a double gimbal assembly which attempts to attain the perfect anti-phase requirement by precise axis orthogonality and by precise geometry.

The condition for 2 N (angular) cancellation with double gimbals is given below by:

$$\frac{K_{x_1} + K_{x_2}}{K_{y_1} + K_{y_2}} = \frac{(a + b - c)_2}{(a + b - c)_1} \quad \text{Equation 2.}$$

In practice the spring constants are fixed as built, and the gimbal dynamic inertias are adjusted to satisfy both the tuning condition given by equation 1 and the equality demanded by equation 2 for 2 N (angular) cancellation.

Reference is made to the mutually perpendicular rotor fixed and undisplaced axes x, y and z throughout the specification and claims to aid description.

According to the present invention a gimbal assembly for carrying a rotor for spin aout a z axis includes an inner member, an outer member, first and second frame members situated between the inner and outer members, first outer pivot means pivoting the first frame member to the outer member about a y axis, second outer pivot means pivoting the second frame member to the outer member about an x axis, first inner pivot means pivoting the second frame member to the inner member about the y axis, second inner pivot means pivoting the first frame member to the inner member about the x axis, the front frame member comprising a continuous periphery having opposed regions at the y axis outwardly directed from the z axis on which the first outer pivot means are carried, further opposed regions at the x axis inwardly directed toward the z axis on which the second inner pivot means are carried, and bridging regions joining the outwardly and inwardly directed regions, the second frame member comprising a continuous periphery identical to that of the first frame member having opposed regions at the x axis outwardly directed from the z axis on which the second outer pivot means are carried, further opposed regions at the y axis inwardly directed toward the z axis on which the first inner pivot means are carried, and bridging regions joining the outwardly and inwardly directed regions, successive bridging regions of one frame member being formed to alternately cross over and cross under the bridging regions of the identically formed other frame member so that the frame members are interlaced. Preferably the pivot means include biassing means which oppose relative pivotal displacement of those members pivoted together.

Preferably the gimbal assembly above described is formed from a billet of solid material with parallel end faces by a method including the not necessarily sequential steps of:

forming between the end faces four identical inwardly extending bores two along the y axis and two along the x axis to accept the first and second pivot means, respectively, forming between the end faces four identical wedge shaped inwardly extending slots equally spaced between and in the same plane as the x and y axes of a depth to leave a boss of solid material on the z axis to eventually form the inner member, forming an outer annular slot co-axially with the z axis to eventually separate the outer member from the frame members, fillets of material being left to hold the partly formed billet rigidly in one piece, forming from the outer annular slot four slots inwardly extending toward the z axis equally spaced between the x and y axes of a length to provide clearance between the first and second frame members, forming an inner annular slot co-axially with the z axis to eventually separate the frame members from the inner member, fillets of material being left to hold the partly formed billet rigidly in one piece, forming four identical inner apertures on a common radius from the z axis, two lying on the x axis and two on the y axis to provide access to inner regions of the pivot means after insertion in their bores, forming four identical outer apertures on a common radius from the z axis, two lying on the x axis and two on the y axis to provide access to outer regions of the pivot means after insertion in their bores, forming an intermediate annular slot between the inner and outer annular slots, again co-axially with the z-axis, the intermediate slot being in four identical segments two being equally spaced about the x axis and two being equally spaced about the y axis to provide eventual separation between the inwardly and outwardly directed regions of the first and second frame members, inserting and anchoring pivot means in the four bores to provide pivots between the inner member and the frame members and between the outer member and the frame members, and, removing the fillets of solid material to release the frame members from one another and from the outer and inner members.

Preferably the pivot means for both the inner and the outer pivots are in one piece for each of the four inwardly extending bores and subsequent to insertion in each bore are separated to form the inner and outer pivot means.

One preferred example of a gimbal assembly according to the invention is illustrated with reference to the accompanying drawings in which.

Figure 4:
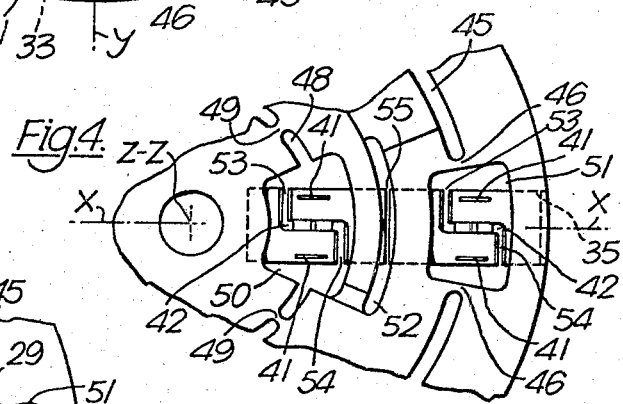
Figure 5:
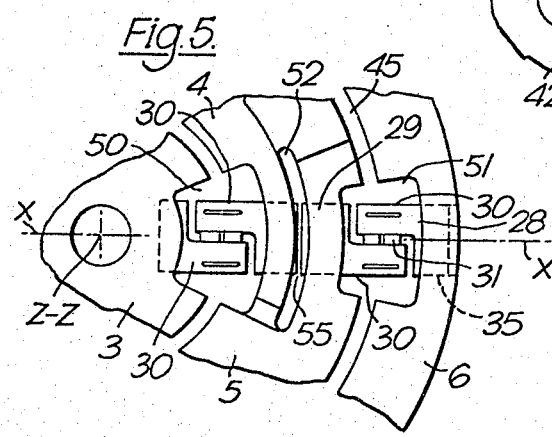

FIG. 3 a, b, c and d, illustrate various manufacturing steps for a gimbal pivot means, and, FIGS. 4 and 5 illustrate the incorporation of pivot means into a partly formed billet and subsequent manufacturing steps.

Figure 1:
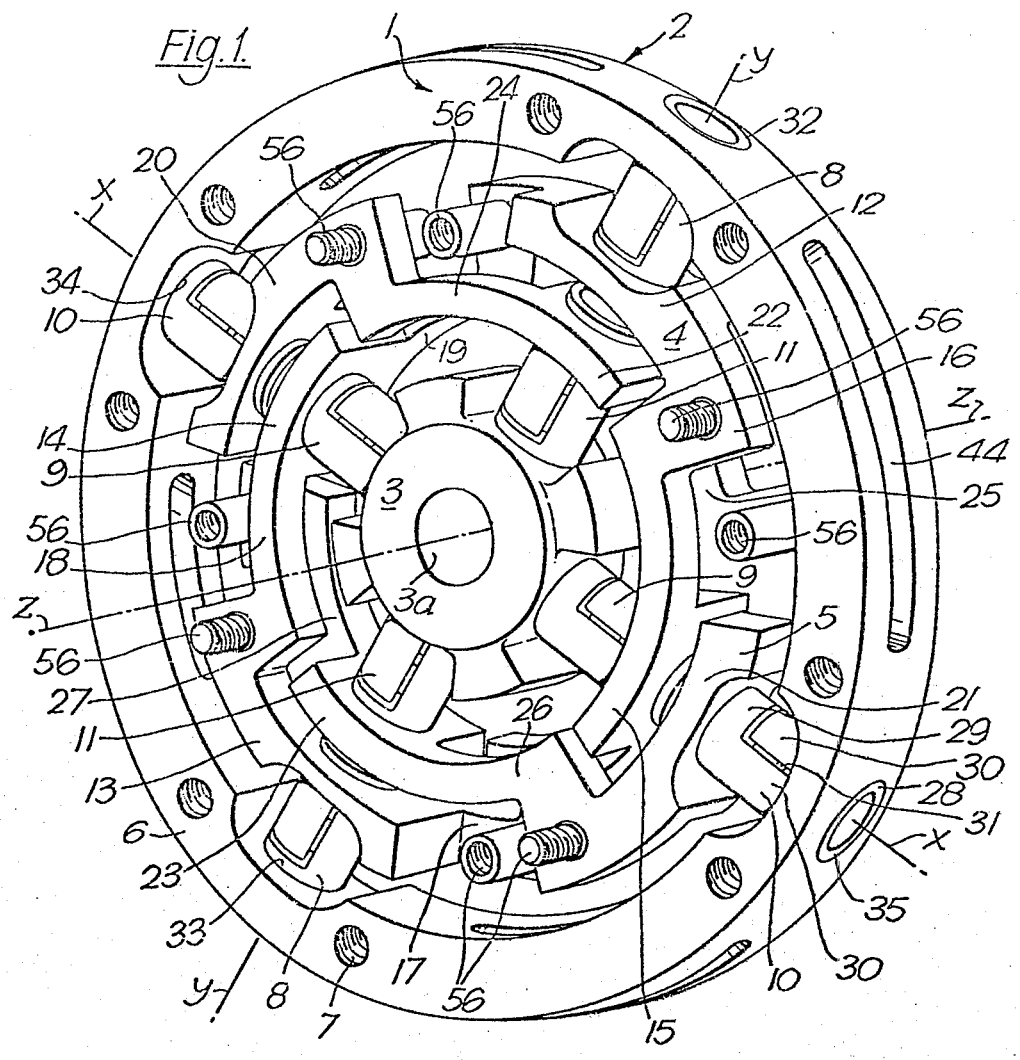
FIG. 1 is an isometric view of a gimbal assembly.

Referring initially to FIG. 1 a gimbal assembly suitable for carrying a gyroscope rotor, not shown, is formed from a billet of solid metal with the addition of pivot means. The billet is of cylindrical form having parallel end faces 1 and 2; the distance between the end faces 1 and 2 (that is to say the length of the billet) is much less than its diameter.

For ease of description the longitudinal axis of the billet is termed the z axis, this being the spin axis of the gyroscope rotor when undisplaced, and two further axes are termed the x and y axes, being the axes about which the rotor pivots when initially undisturbed.

All three axes are mutually perpendicular and the x and y axes lie in the same plane.

The gimbal assembly is symmetrically arranged around the z axis; it is also symmetrically arranged about both the X and Y axes.

The gimbal assembly has a central boss or inner member 3 through which extends a bore 3a co-axially formed with the z axis.

The inner member carries first and second frame members 4 and 5, respectively, which themselves carry a mounting ring or outer member 6 on pivot means to be described. The outer member is provided with screwed holes 7. The outer member 6 is in the form of a complete annulus.

The first frame member 4 is pivoted to the outer member 6 about the Y axis by first outer pivot means 8 and to the inner member 3 about the x axis by second inner pivot means 9 whilst the second frame member 5 is pivoted to the outer member 6 about the x axis by second outer pivot means 10 and to the inner member 3 about the Y axis by first inner pivot means 11.

Both frame members 4 and 5 are of identical form and each comprise a continuous periphery formed in one piece. That referenced 4 has opposed regions 12 and 13 outwardly directed from the z axis at the y axis on which the first outer pivot means 8 are carried, and opposed regions 14 and 15 inwardly directed toward the z axis at the X axis on which the second inner pivot means 9 are carried. The regions 12 and 15 are joined by a bridging region 16 which lies toward that end face referenced 1, the regions 15 and 13 are joined by a bridging region 17 which lies toward that end face referenced 2, the regions 13 and 14 are joined by a bridging region 18 which lies toward the end face 1, and finally to complete the periphery, the regions 14 and 12 are joined by a bridging region 19 which lies toward the end face 2.

That frame member 5 has opposed regions 20 and 21 outwardly directed from the z axis at the x axis on which the second outer pivot means 10 are carried, and opposed regions 22 and 23 inwardly directed toward the z axis at the y axis on which the first inner pivot means 11 are carried. The regions 20 and 22 are joned by a bridging region 24 which lies toward the face 1 and crosses over the bridging region 19 of the frame member 4, the regions 22 and 21 are joined by a bridging region 25 which lies toward the face 2 and crosses under the bridging region 16 of the frame member 4, the regions 21 and 123 are joined by a bridging region 26 which lies toward the face 1 and crosses over the bridging region 17 of the frame member 4, and finally, to complete the periphery, the regions 23 and 20 are joined by a bridging region 27 which lies toward the face 2 and crosses under the bridging region 18 of the frame member 4. The frame members 4 and 5 are thus interlaced one with another.

The pivot means are of the type which include biassing means which oppose relative pivotal displacement of those members pivoted together. In this embodiment, the first and second outer pivot means 8 and 10, and the first and second inner pivot means 11 and 9 are all identical; accordingly it suffices to describe just one example.

Each of said outer and inner pivot means has two spaced pivot units coaxially mounted on the x or the y axis on opposite sides of the z axis.

Each pivot unit comprises a tubular body having one portion 28 and a separated further portion 29 co-axially arranged, each portion having a tongue 30 projecting toward the other portion and lying beside the tongue 30 of that other portion. Twin transverse leaf spring members 31 extend between the tongues 30, the members 31 being axially spaced and set normally to one another in a cruciform arrangement.

The inner member 3, the frame members 4 and 5 and the outer member 6 are formed with bores 32 and 33 coincident with the y axis and bores 34 and 35 coincident with the x axis in which the portions 28 and 29 of each pivot unit are housed and are fixedly located.

Preferably the pivot units are formed as four sets of axially joined pairs, each pair being inserted in one of the bores 32, 33, 34 or 35 and subsequently separated. FIG. 3 refers.

Each pair, that is to say, a first outer pivot means 8 and a first inner pivot means 11, or a second outer pivot means 10 and a second inner pivot means 9, is formed of a tube 40 of a length chosen to extend from the inner, through the frames, to the outer member when inserted into a bore 32, 33, 34 or 35.

Figure 3A:
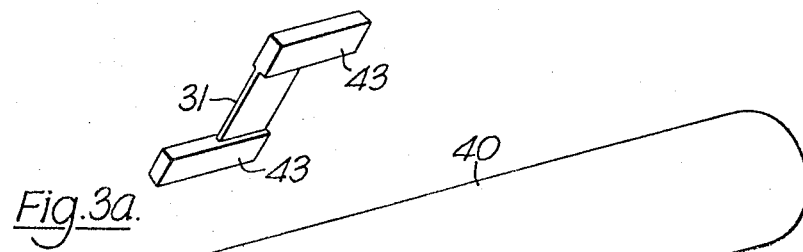
Figure 3B:
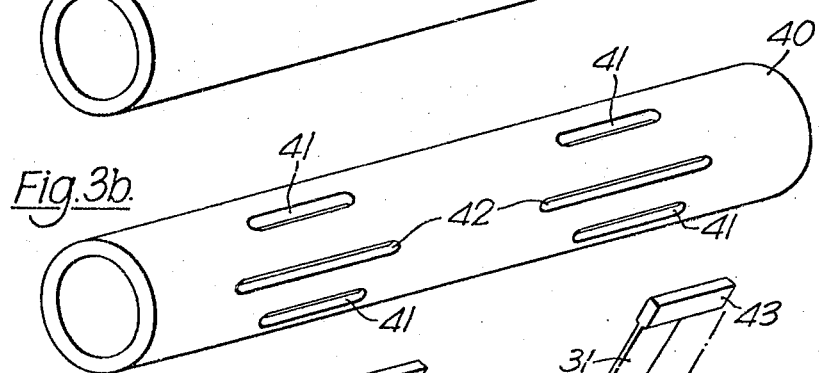
Figure 3C:
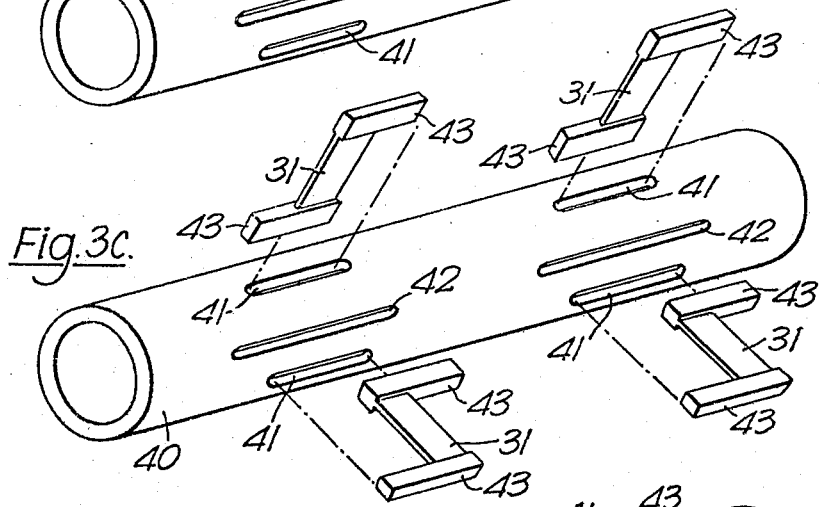

The tube 40 is formed, as shown in FIG. 3b, with eight longitudinal slits 41 in two axially spaced sets of four. Each set of four has its slits in two pairs oppositely opposed and set at 90° to one another. These slits 41 are for the location of the leaf spring members 31.

The tube is further formed with four longitudinal slits 42 in two axially spaced sets of two. In each set, the two slits are opposite one another. These slits are for eventual separation of the pivot units and form adjacent edges of the tongues 30.

Figure 3D:
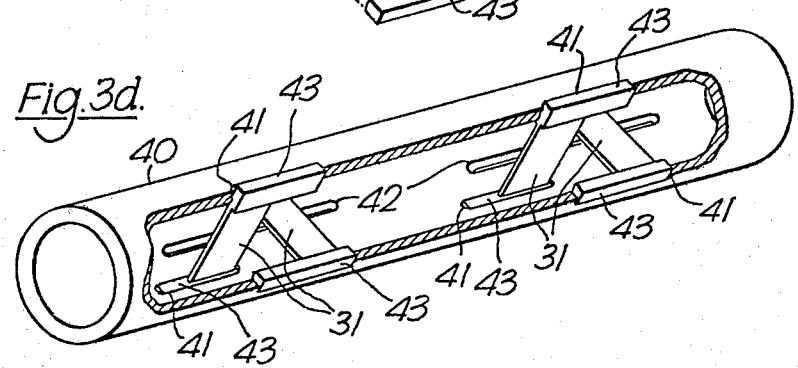

The leaf spring members 31 have end portions 43 which are slotted to engage side edges of the slits 41 so that the spring members extend across the interior of the tube from one of a pair of slits to the other. The leaf spring members are brazed in place as shown in FIG. 3d.

Figure 2:
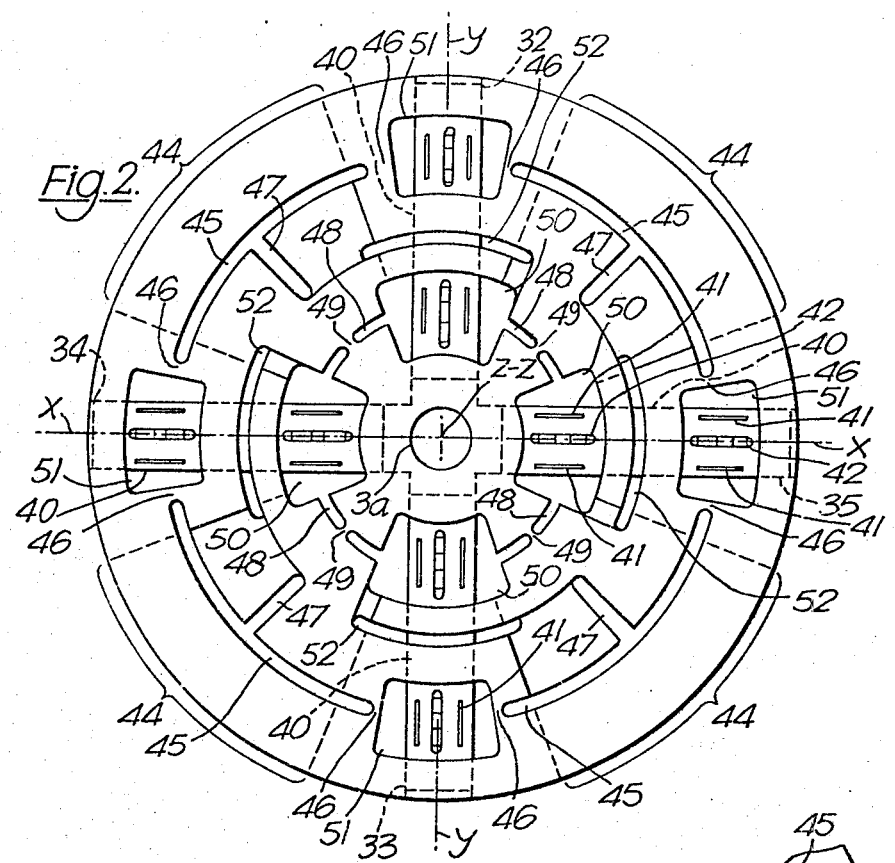
FIG. 2 is an end view illustrating various manufacturing steps.

Referring now to FIG. 2, the inner member 3, the frames 4 and 5, and the outer member are conveniently formed from a cylindrical billet of solid material. This has the two parallel end faces 1 and 2 equally spaced from the plane of the x and y axes.

The axial bore 3a is formed along the z axis and then the four inwardly extending bores 32, 33 and 34, 35 are formed which will accept the pivot means.

Four wedge shaped inwardly extending slots 44 are then formed between the end faces 1 and 2 equally spaced between and in the same plane as the x and y axes. The slots extend inwardly to a depth which leaves a boss of solid material which will eventually form the inner member 3.

The four inwardly extending bores 32, 33 and 34, 35 extend into the inner member 3.

An outer annular slot 45 is formed co-axially with the z axis right through the billet to eventually separate the outer member 6 from the frame members 4 and 5, fillets of material 46 being left to temporarily hold the partly formed billet rigidly in one piece.

Four inwardly extending (i.e. toward the z axis) slots 47 are formed from the outer annular slot 45 equally spaced between the x and y axes of a length to provide clearance between the first and second frame members 4 and 5.

An inner annular slot 48 is formed co-axially with the z axis to eventually separate the frame members 4 and 5 from the inner member 3, fillets of material 49 again being left to hold the partly formed billet rigidly in one piece.

Four identical inner apertures 50 are formed on a common radius from the z axis, two lying on the x axis and two on the y axis to provide inner access to the pivot means after insertion in the bores 32, 33 and 34, 35.

Four identical outer apertures 51 are formed on a common radius from the z axis, two lying on the x axis and two on the y axis to provide outer access to the pivot means after insertion in the bores 32, 33 and 34, 35.

An intermediate annular slot 52 is formed between the inner and outer annular slots 48 and 45, again co-axially with the z-axis, the intermediate slot being in four slot segments two being equally spaced about the x axis and two being equally spaced about the y axis to provide eventual separation between the inwardly and outwardly directed regions of the first and second frame members.

At this stage the four pairs of pivot units are inserted into the four bores 32, 33 and 34, 35 so that the slits 42 lie in the apertures 50 and 51. The regions of the tubes 40 which will on separation form the portions 28 and 29 are then brazed in position to their respective members.

The tubes 40 are then cut transversly to the axis x or y, those cuts referenced 53 and 54 extending from the periphery of the tube to the slits 42, that is to say extending only part way across the tubes to form the tongues 30, and those cuts referenced 55 extending fully across the tubes to separate the inner from the outer pivot units of each pair. Access to allow the cuts 53 and 54 to be made is through the apertures 50 and 51 whilst access for the cuts 55 are provided by the segments of the intermediate slot 52.

The inner member 3 and the frame members 4 and 5 are finally separated by removal of the fillets 49, and the members 4 and 5 are finally separated from the outer member 6 by removal of the fillets 46.

At the same stage prior to final separation the frame members 4 and 5 are provided with screw holders 56 and screws therein to allow adjustment of their dynamic inertias. As shown, the screw holders 56 are mounted upon cut away regions of the bridging regions 16 to 19 and 24 to 27, respectively.

The forming and cutting of the various components is preferably effected by a process such as spark machining. Any brazing or welding is effected by electron beam processes.

Some advantages accrueing from the invention as described are as follows:

1. The axes x, y and z can be precisely spatially aligned and the pivot means can be accurately positioned upon the x and the y axes.
2. The frames 4 and 5 can be symmetrically and identically formed so that in effect each frame ghosts the other as the gimbal assembly rotates to provide the effect of two mechanically identical gyroscopes spatially displaced by a period of one quarter of one revolution.
3. Rotor mechanical noise (due to swashing and coning) is reduced such that a useful improvement in pick-off resolution can be achieved with the result of yet further reducing any residual rotor offset and elastic restraint drift errors.
4. The gimbal assembly provides a high rejection of any 2 N angular vibration input.
5. The overall manufacturing costs can be accurately forecast and maintained since the forming operations rely in the main upon programmable machining operations rather than the variable assembly skills of personnel.

We claim:

1. A gimbal assembly for carrying a rotor for spin about a z axis includes an inner member, an outer member, first and second frame members situated between the inner and outer members, first outer pivot means pivoting the first frame member to the outer member about a y axis, second outer pivot means pivoting the second frame member to the outer member about an x axis, first inner pivot means pivoting the second frame member to the inner member about the y axis, second inner pivot means pivoting the first frame member to the inner member about the x axis, the first frame member comprising a continuous periphery having opposed regions at the y axis outwardly directed from the z axis on which the first outer pivot means are carried, further opposed regions at the x axis inwardly directed toward the z axis on which the second inner pivot means are carried, and bridging regions joining the outwardly and inwardly directed regions, the second frame member comprising a continuous periphery identical to that of the first frame member having opposed regions at the x axis outwardly directed from the z axis on which the second outer pivot means are carried, further opposed regions at the y axis inwardly directed toward the z axis on which the first inner pivot means are carried, and bridging regions joining the outwardly and inwardly directed regions, successive bridging regions of one frame member being formed to alternately cross over and cross under the bridging regions of the identically formed other frame member so that the frame members are interlaced.

2. A gimbal assembly according to claim 1 wherein the pivot means include biassing means which oppose relative pivotal displacement of the pivoted members.

3. A gimbal assembly according to claim 2 wherein the biassing means include leaf spring members which extend for flexure between the pivoted members.

4. A method of forming a gimbal assembly as defined in claim 1 from a billet of solid material with parallel end faces, including the not necessarily sequential steps of:

forming between the end faces four identical inwardly extending bores two along the y axis and two along the x axis to accept the first and second pivot means respectively, forming between the end faces four identical wedge shaped inwardly extending slots equally spaced between and in the same plane as the x and y axes of a depth to leave a boss of solid material on the z axis to eventually form the inner member, forming an outer annular slot co-axially with the z axis to eventually separate the outer member from the frame members, fillets of material being left to hold the partly formed billet rigidly in one piece, forming from the outer annular slot four identical slots inwardly extending toward the z axis equally spaced between the x and y axes of a length to provide clearance between the first and second frame members, forming an inner annular slot co-axially with the z axis to eventually separate the frame members from the inner member, fillets of material being left to hold the partly formed billet rigidly in one piece, forming four identical inner apertures on a common radius from the z axis, two lying on the x axis and two on the y axis to provide access to inner regions of the pivot means after insertion in their bores, forming four identical outer apertures on a common radius from the z axis, two lying on the x axis and two on the y axis to provide access to outer regions of the pivot means after insertion in their bores, forming an intermediate annular slot between the inner and outer annular slots, again co-axially with the z axis, the intermediate slot being in four identical segments two being equally spaced about the x axis and two being equally spaced about the y axis to provide eventual separation between the inwardly and outwardly directed regions of the first and second frame members, inserting and anchoring pivot means in the four bores to provide pivots between the inner member and the frame members and between the outer member and the frame members, and, removing the fillets of solid material to release the frame members from one another and from the outer and inner members.

5. A method of forming a gimbal assembly according to claim 4 wherein a bore is formed along the z axis.

6. A method of forming a gimbal assembly according to claim 4 wherein the pivot means are formed as four sets of axially joined pairs of pivot units, each pair of units being inserted in one of said bores and subsequently separated to form separate pivot ends.

* * * * *